Nov. 2, 1965   B. T. WILLMAN   3,215,198
PRESSURE MAINTENANCE FOR GAS SANDS
Filed Dec. 14, 1961

BERTRAM T. WILLMAN *INVENTOR.*

BY *Gary C. Honeycutt*
AGENT

United States Patent Office 3,215,198
Patented Nov. 2, 1965

3,215,198
PRESSURE MAINTENANCE FOR GAS SANDS
Bertram T. Willman, Tulsa, Okla., assignor, by mesne assignments, to Esso Production Research Company, Houston, Tex., a corporation of Delaware
Filed Dec. 14, 1961, Ser. No. 159,345
7 Claims. (Cl. 166—9)

This invention relates to the production of natural gas from porous underground reservoirs. Broadly, the invention is concerned with pressure maintenance within a gas reservoir wherein production is accompanied by water invasion. More specifically, a method is provided for increasing total recovery of natural gas from such a reservoir by injecting an inexpensive gas in or near the water-gas transition zone.

Frequently, a productive gas sand is found just above and in communication with an aquifer, with the result that as gas is withdrawn from the reservoir a water front invades the gas sand. Laboratory and field tests have shown that large volumes of gas are trapped as a residual phase behind the invading water front. The volume of trapped gas is of the same order of magnitude as the volume of residual oil trapped in such a formation by conventional water flooding of oil sands. Because of this trapped gas phase, from one-fifth to one-half of the initial gas volume is potentially lost as a residual phase once the structure is filled with water.

In accordance with the invention, one or more injection wells are completed over an interval just above or in the water-gas transition zone. Nitrogen, carbon dioxide, a flue gas having a relatively low oxgen content, or other low-value gas is compressed and injected to form a gas blanket above the invading water front. Although air may be injected, it is considered undesirable because of safety hazards. Once the low cost gas bank is formed, further advancement of the invading water front can no longer entrap the valuable natural gas. Instead, the low cost gas is trapped as a residual phase with the result that ultimate recovery of natural gas from up-structure wells is virtually complete.

A detailed description of the invention is provided by reference to the accompanying drawings.

Figure 1:
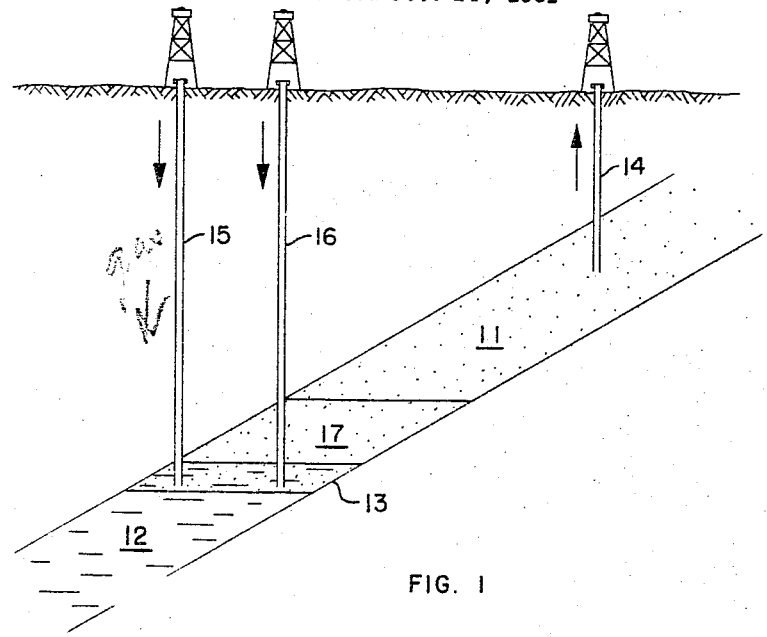
FIGURE 1 represents a cross-section of the earth, showing the location of an injected low-value gas bank with respect to the original fluids within a natural gas reservoir.

Referring now to FIGURE 1 in detail, subterranean natural gas reservoir 11 is underlain by water-bearing zone 12. Intermediate the gas and water zones lies a transition zone 13 characterized by progressively increasing concentrations of water in the direction of the water zone and increasing saturation of gas in the direction of the gas zone. One or more wells 14 in the crest of the structure are produced in a conventional manner.

According to this invention, wells 15 and 16 are drilled and completed in or near transition zone 13. Combustion products, or other low cost gas is injected through wells 15 and 16, building up an injected layer of gas 17 which extends into the transition zone of the reservoir. Since diffusion rates in porous media are low, production of natural gas from up-structure wells 14 need not, and preferably is not interrupted. That is, the gas produced from up-structure wells is not contaminated by the low cost injected gas, and conversely, formation of the injected layer is not disturbed by the up-structure production.

The benefit of increased total recovery of natural gas is realized from the injection of any substantial volume of low-value gas. However, it is preferred to inject a volume which is just sufficient to supply the total residual gas phase existing after complete flooding of the reservoir. This preferred volume is conveniently determined by removing cores from the formation in the drilling of an injection well and subjecting these cores to laboratory experimentation to determine the volume of residual gas phase saturation left in the structure behind an invading water front. This residual gas saturation value is then multiplied by the total volume of reservoir to be invaded by water as natural gas is produced from the structure. Since the reservoir pressure at the time of injection is considerably greater than the anticipated pressure at the time of abandonment, a correction is introduced into the calculation which takes this difference into account. A detailed description of a suitable core-flooding technique is found in volume 195 of "Petroleum Transactions, A.I.M.E.", pp. 29–38 (1952).

Once the formation of the injected gas blanket is complete, the injection wells are shut in. Continued gas production from up-structure wells 14 now causes the advancing water front to trap the injected gas instead of the natural gas with the result that ultimate recovery from the reservoir will be virtually complete.

Figure 2:
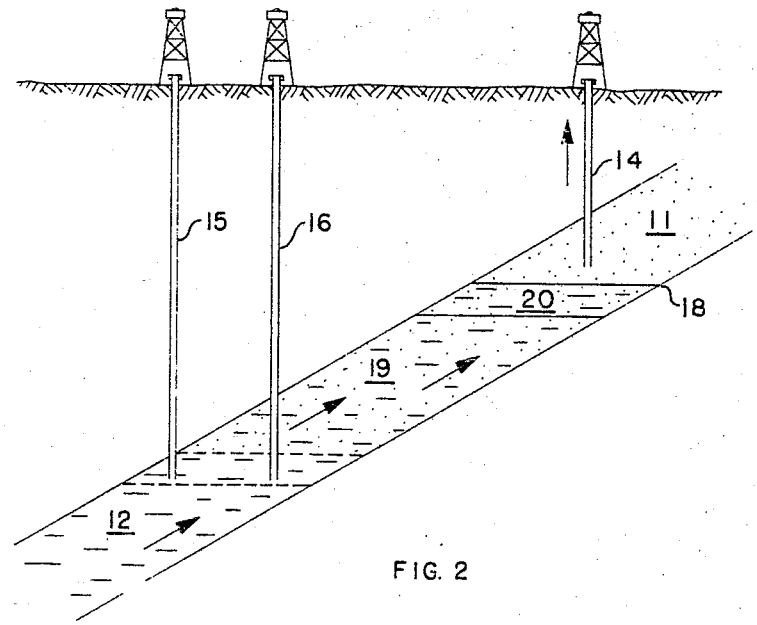
FIGURE 2 represents the same cross-section as above,, and shows the ultimate conditions of the reservoir upon substantial depletion of its natural gas content.

Referring to FIGURE 2, the condition of the reservoir is shown after prolonged production of natural gas from wells 14 has caused the invading water front to advance up-structure to a position 18 near the crest of the reservoir. Transition zone 13 has moved up-structure and is now designated zone 20. Water saturation within zone 20 ranges from a minimum which corresponds to the original connate water saturation of zone 11, to a maximum which corresponds to the water saturation which now exists essentially uniformly throughout zone 19. The injected gas of zone 17 in FIGURE 1 is now trapped as a residual gas phase in zone 19.

The percentage of reservoir pore space which is ultimately occupied by residual gas phase trapped behind the invading water front is, in many respects, a virtually "immutable" characteristic of the formation itself. That is, changes in static pressure, changes in temperature, and even changes in flood rates are all ineffective to change the residual volume of trapped gas. The amount of gas which the trapped volume represents is, of course, a function of the reservoir pressure. Moreover, continued flooding far behind the advancing water front fails to displace any significant further volumes of gas, except for an amount which corresponds to expansion of the residual gas, should reservoir pressure be decreased. Any continued volumetric reduction in residual gas saturation appears to be limited to solubility of the residual gas in water, which, in terms of economic recovery, is negligible or to an increase in pressure, which does not increase the mass of residual gas.

In zone 12 of the typical reservoir shown in the drawings, the formation pore space is essentially completely saturated with water. However, the opposite is not true of zone 11; that is, initial gas saturation in such a reservoir is usually only 60–90%, due to the presence of connate water.

Although the invention may readily be practiced using a single injection well, it is preferred to employ a plurality of such wells. The choice of a lateral spacing pattern for the wells is governed by the size and shape of the reservoir; by the rock characteristics, such as permeability; by the production schedule of the reservoir; and by the total volume of gas to be injected.

One variation of the invention involves simultaneous production and injection at a depth near the top of the gas-water transition zone. Production of the natural gas from one area at this level creates a "pressure sink," whereby low-value gas injected at an area laterally spaced therefrom is caused to spread preferentially toward the production well. Then, before a substantial volume of injected gas appears at the production well, flow at the production well is reversed by converting to injection of low-value gas. When several wells are employed, a pressure sink is then created at still a third laterally spaced well, and successively at each of the remaining wells until the desired blanket of low-value gas is formed. As mentioned earlier, the withdrawal of additional natural gas through one or more separate production wells relatively remote from the water front may be continued during the formation of the injected layer of low cost gas.

A further modification of the above injection pattern involves the simultaneous generation of a plurality of laterally spaced pressure sinks, by producing natural gas simultaneously from a plurality of laterally spaced wells, while concurrently injecting flue gas or the like via a plurality of injection wells interspersed among the production wells.

The method of the invention is applicable not only to a natural water drive, but to artificial water flooding as well. Moreover, a natural water drive is conveniently supplemented by injecting water, for example via wells 15 and 16 after the desired volume of low-value gas has been injected.

The invention is applicable in any natural gas reservoir where a natural or injected water front invades the sand upon the withdrawal of gas. In addition to the typical dip reservoir shown in the drawings, a dome-shaped gas reservoir is amenable to the same improved pressure maintenance, when underlain by an aquifer or subjected to a water flood.

As an example of the invention, assume the method is to be used in the recovery of gas from a 300 acre formation which is 18 ft. thick and has a porosity of 27 percent. Thus:

300 acres × 18 ft. × .27 × 43,560 ft.$^3$/acre-ft. = 63.5 million cubic feet of reservoir pore volume.

Analysis of cores taken in drilling injection wells shows the pore space to be 30 percent saturated with connate water. Flooding of the cores with water indicates a residual gas saturation of 30 percent of pore space. Accordingly, it is estimated that only 25.4 million cu. ft. of gas, at reservoir conditions, is recoverable without the method of the invention. By injecting (.30 × 63.5) = 19 million cu. ft. of flue gas or other low-value gas, at reservoir conditions, the total recovery of natural gas is increased by a like volume, which represents a 75% increase in recovery, attributable to the present invention. Preferably, an additional volume of flue gas is injected to allow for its solubility in water. This amount will vary depending upon the composition of the gas, and reservoir conditions, as readily understood by one skilled in the art.

What is claimed is:

1. In the production of natural hydrocarbon gases from a porous underground reservoir wherein said gases are driven by an invading water front in contact with said gases, the method of minimizing loss of said hydrocarbon gases due to entrapment behind the invading water front which comprises injecting via an injection well a low cost gas blanket adjacent said water front and withdrawing said natural gases from said reservoir through a production well at a location relatively removed from said front, whereby the advancing water front entraps the injected gases instead of the valuable hydrocarbon gases.

2. A method for increasing the total recovery of natural hydrocarbon gases from an underground porous natural gas reservoir, said gas reservoir having a water zone adjacent thereto and a gas-water transition zone, which comprises completing at least one injection well in the vicinity of said transition zone, injecting a low cost gas via said injection well to form a gas blanket in and above said transition zone, and producing said natural gas from a region within said reservoir via a producing well relatively remote from the low cost blanket whereby entrapment of said natural gas behind the advancing water front is minimized.

3. A method as defined by claim 2 wherein the injected gas comprises a flue gas having a minimum oxygen content.

4. A method for increasing the total recovery of natural hydrocarbon gases from an underground porous natural gas reservoir, the natural gas of said reservoir being producible by means of a natural water drive which creates an advancing water front and a gas-water transition zone subjacent the zone occupied by said natural gas, which comprises completing at least one injection well in the vicinity of said transition zone, injecting a low cost gas via said injection well to form a low cost gas blanket in and above said transition zone, producing said natural gas from a region within said reservoir via a producing well relatively remote from said low cost blanket, whereby entrapment of said natural gas behind the advancing water front is minimized, and supplementing said natural water drive by injecting water via at least one of the same wells employed for injecting said low cost gas.

5. A method as defined by claim 4 wherein the injected gas comprises a flue gas having a minimum oxygen content.

6. A method for increasing the total recovery of natural gas from an underground porous reservoir, said reservoir having a water zone subjacent thereto, and a gas-water transition zone, which comprises completing a plurality of wells near the top of said transition zone, injecting a low cost gas via at least one of said wells while producing natural gas from at least one other of said wells laterally spaced therefrom to create a first pressure sink for facilitating the formation of a layer of said injected gas, thereafter interrupting said production and injecting additional low cost gas into the region of said first pressure sink, then creating a second pressure sink near the top of the transition zone by producing natural gas through another of said plurality of wells from a region more remote from said first injection well than said first pressure sink, thereafter successively pairing injection and production in the remaining laterally spaced wells until the desired low cost gas blanket is formed, and producing natural gas through a separate production well from a region of said reservoir relatively remote from said transition zone, whereby entrapment of natural gas behind the advancing water front is minimized.

7. In the production of natural hydrocarbon gases from a porous underground reservoir wherein said gases are driven by an invading water front in contact with said gases, the method of minimizing loss of said hydrocarbon gases due to entrapment behind the invading water which comprises injecting via an injection well a low cost gas adjacent said water front, the volume of said injected gas being sufficient to supply the total residual gas phase existing after complete flooding of the reservoir, and withdrawing said natural gases from said reservoir through a production well at a location relatively remote from said front, whereby the advancing water entraps the injected gas instead of the reservoir hydrocarbon gases.

References Cited by the Examiner

UNITED STATES PATENTS

| | | | |
|---|---|---|---|
| 2,767,791 | 10/56 | Van Dijck | 166—9 X |
| 2,885,003 | 5/59 | Lindauer | 166—9 |
| 3,149,668 | 9/64 | Arendt | 166—9 X |

OTHER REFERENCES

Uren, L. C.: Petroleum Production Engineering (Oil Field Exploration), 2nd edition, McGraw-Hill Book Company, Inc., New York, 1939, page 423.

Muskat M.: Physical Principles of Oil Production, first edition, McGraw-Hill Book Company, Inc., New York, 1949, pages 754 and 768 to 771.

BENJAMIN HERSH, *Primary Examiner.*

CHARLES E. O'CONNELL, *Examiner.*